US011986973B2

(12) United States Patent
Raczki

(10) Patent No.: US 11,986,973 B2
(45) Date of Patent: May 21, 2024

(54) SHOOTING BOARD JIG DEVICE

(71) Applicant: Robert Raczki, Prince George (CA)

(72) Inventor: Robert Raczki, Prince George (CA)

( * ) Notice: Subject to any disclaimer, the term of this patent is extended or adjusted under 35 U.S.C. 154(b) by 171 days.

(21) Appl. No.: 17/521,179

(22) Filed: Nov. 8, 2021

(65) Prior Publication Data

US 2022/0143862 A1 May 12, 2022

Related U.S. Application Data

(60) Provisional application No. 63/112,311, filed on Nov. 11, 2020.

(51) Int. Cl.
*B27G 17/02* (2006.01)
*B27C 1/14* (2006.01)

(52) U.S. Cl.
CPC .............. *B27G 17/025* (2013.01); *B27C 1/14* (2013.01)

(58) Field of Classification Search
CPC ........... B27B 9/04; B27B 11/02; B27B 27/08; B27B 27/10; B27C 1/14; B27C 1/002; B27C 1/12; B27C 5/04; B27G 17/02; B27G 17/025; B23Q 3/005; B23Q 3/02; B23Q 9/0014; B23Q 9/0042; B23Q 9/0064; B23Q 9/0078
See application file for complete search history.

(56) References Cited

U.S. PATENT DOCUMENTS 2,013,780 A * 9/1935 Holzheimer ......... B27G 17/025 30/280
2,905,210 A * 9/1959 Thomas .................. B27B 25/10 83/416
3,901,498 A * 8/1975 Novak ................... B27G 5/023 269/319
4,608,761 A * 9/1986 Small ................... B23Q 9/0092 30/376
5,279,198 A * 1/1994 Cross ....................... B27G 5/02 83/758
5,293,801 A * 3/1994 Dritenbas .............. B27G 5/023 83/486.1

FOREIGN PATENT DOCUMENTS

EP 1422033 A1 * 5/2004 ........... B23D 47/025
KR 20040006048 A1 * 1/2004 ............. B27B 27/10

* cited by examiner

*Primary Examiner* — Adam J Eiseman
*Assistant Examiner* — Jared O Brown
(74) *Attorney, Agent, or Firm* — Brennan, Manna & Diamond, LLC

(57) ABSTRACT

The present invention relates to a shooting board jig device. The device is comprised of a body having a base plate and a guide fence. The guide fence can be repositioned at a plurality of angles within a 360-degree range of movement atop the base plate and secured in said position via a pin. A hand planer known in the art can further be positioned along any side of the base plate. The generally L-shaped guide fence can then receive a board. The board is then placed towards the hand planer at the selected angle, such that the planar can be used to plane the edge or the end of the board. In this manner, the device allows a user to plane a board at a plurality of desired angles.

6 Claims, 3 Drawing Sheets

SHOOTING BOARD JIG DEVICE

CROSS-REFERENCE TO RELATED APPLICATION

The present application claims priority to, and the benefit of, U.S. Provisional Application No. 63/112,311, which was filed on Nov. 11, 2020 and is incorporated herein by reference in its entirety.

FIELD OF THE INVENTION

The present invention relates generally to the field of woodworking jigs. More specifically, the present invention relates to a shooting board jig device. The device is comprised of a body further comprised of a base plate and a guide fence. The guide fence can be repositioned at a plurality of angles within a 360-degree range of movement atop the base plate, and secured in said position via a pin. The generally L-shaped guide fence can then receive a board. In this manner, the device allows a user to plane a board at a plurality of desired angles. Accordingly, the present disclosure makes specific reference thereto. Nonetheless, it is to be appreciated that aspects of the present invention are also equally applicable to other like applications, devices and methods of manufacture.

BACKGROUND

In woodworking, a shooting board is a specific type of woodworking jig that is used in combination with a hand planer or jointer to allow a user to trim and square the edges and ends of wooden board during jointing and end grain trimming. Existing shooting boards known in the art are normally comprised of a flat board that acts as a base. The board further has a stop at one end, on which the board to be planed is rested and wherein the stop prevents the board from sliding as it is planed by a hand plane. A fence is further typically located parallel to the base, wherein the height difference between the base and the fence allows for the offset of the hand planer blade. The fence further guides the planer along the edge of the board being planed, such that the blade in the plane is presented at 90 degrees with respect to the base of the shooting board. However, existing shooting boards known in the art normally only allow boards to be planed at 90 degrees. This is undesirable for an individual who wishes to plane the edges and ends of a board at an angle other than 90 degrees. Further, existing shooting boards known in the art typically only allow the shooting board to be used with a hand planer at one specific side of the board, which is undesirable for users who may have the opposite dominant hand of the side the hand planer is located on (i.e., a left-handed individual with a planer positioned on the righthand side of the shooting board).

Therefore, there exists a long-felt need in the art for an improved shooting board. There also exists a long-felt need in the art for a shooting board jig device that allows a user to plane a board at a plurality of differing angles. Finally, there exists a long-felt need in the art for a shooting board jig device that is ambidextrous, such that it can be used by left-handed and right-handed users alike.

The subject matter disclosed and claimed herein, in one embodiment thereof, comprises a shooting board jig device. The device is comprised of a body having a base plate and a guide fence. The guide fence can be repositioned at a plurality of angles within a 360-degree range of movement atop the base plate, and can be secured in position via a pin.

A hand planer known in the art can further be positioned along any side of the base plate. The generally L-shaped guide fence can then receive a board, wherein the board is placed towards the hand planer at the selected angle, such that the planar can be used to plane the edge or the end of the board. In this manner, the device allows a user to plane a board at a plurality of desired angles.

In this manner, the shooting board jig device of the present invention accomplishes all of the forgoing objectives and provides an improved shooting board-type device. The device is particularly advantageous as it allows a user to plane a board at a plurality of differing angles. In addition, because of the 360 degree rotation of the guide fence that allows a hand planer to be positioned on any side of the base plate, the device can easily be used by left-handed and right-handed users. In this manner, the shooting board jig device overcomes the limitations of existing shooting boards known in the art.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a shooting board jig device primarily comprised of a body that is further comprised of a base plate and a guide fence. The body is preferably rectangular in shape, and is comprised of a durable metal material. The top surface of the base plate is further comprised of at least one continuous fastener opening that can receive at least one fastener, such as but not limited to, a screw, a bolt, or a nail. The fastener can be used to fixedly or removably-attach the base plate to a surface, such as but not limited to, a work bench (not shown). A guide fence further attaches to the top surface via a pivot pin, wherein the pivot pin allows the fence to be repositioned within a 360-degree range of movement. The guide fence is further comprised of a horizontal member that is fixedly or removably-attached to a vertical member that forms a generally L-shaped body.

The top surface of the base plate is further comprised of a plurality of indicia disposed in a radial fashion around the guide fence, wherein the indicia may include guidelines (i.e., vertical lines) as well as angle measurements, such as but not limited to: 0°, 15°, 22.5°, 30°, 45°, or any other angle within 360°. At least one continuous opening is further located above or below each indicia. The guide fence can be repositioned (i.e., rotated) on the top surface, such that at least one continuous opening on the horizontal member of the fence aligns with the at least one continuous opening on the top surface of the base plate. Therefore, the fence can be positioned at a specific angle in relation to the base plate, as indicated by the indicia. To removably secure the guide fence at the desired angle, a removable pin can further be secured through the opening of the horizontal member and the corresponding opening on the top surface.

The device can further be comprised of a method of using the device to plane a board using a hand planer. First, a user secures the base plate to a surface (i.e., a work bench) via placing at least one fastener through at least one continuous fastener opening of the base. Next, a user can reposition the guide fence to orient the fence at a desired angle relative to the hand planer, wherein the angle can be identified via the indicia on the top surface of the base plate. A user can then secure the fence in the desired position via inserting a pin through the continuous openings of the horizontal member of the fence and the corresponding continuous opening in the base plate. Next, a user can place a wooden board on the fence, such that the board rests on the horizontal member with the edge of the board sitting flush against the vertical member. Then, the desired edge or end of the board can be planed using the hand planer to shave the edge or end at the desired current angle of the guide fence.

Accordingly, the shooting board jig device of the present invention is particularly advantageous, as it allows a user to plane a board at a plurality of differing angles. In addition, because of the 360 degree rotation of the guide fence that allows a hand planer to be positioned on any side of the base plate, the device can be easily used by both left-handed and right-handed users. In this manner, the shooting board jig device overcomes the limitations of existing shooting boards known in the art.

Therefore, there exists a long-felt need in the art for an improved shooting board. There also exists a long-felt need in the art for a shooting board jig device that allows a user to plane a board at a plurality of differing angles. Finally, there exists a long-felt need in the art for a shooting board jig device that is ambidextrous, such that it can be used by both left-handed and right-handed users.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
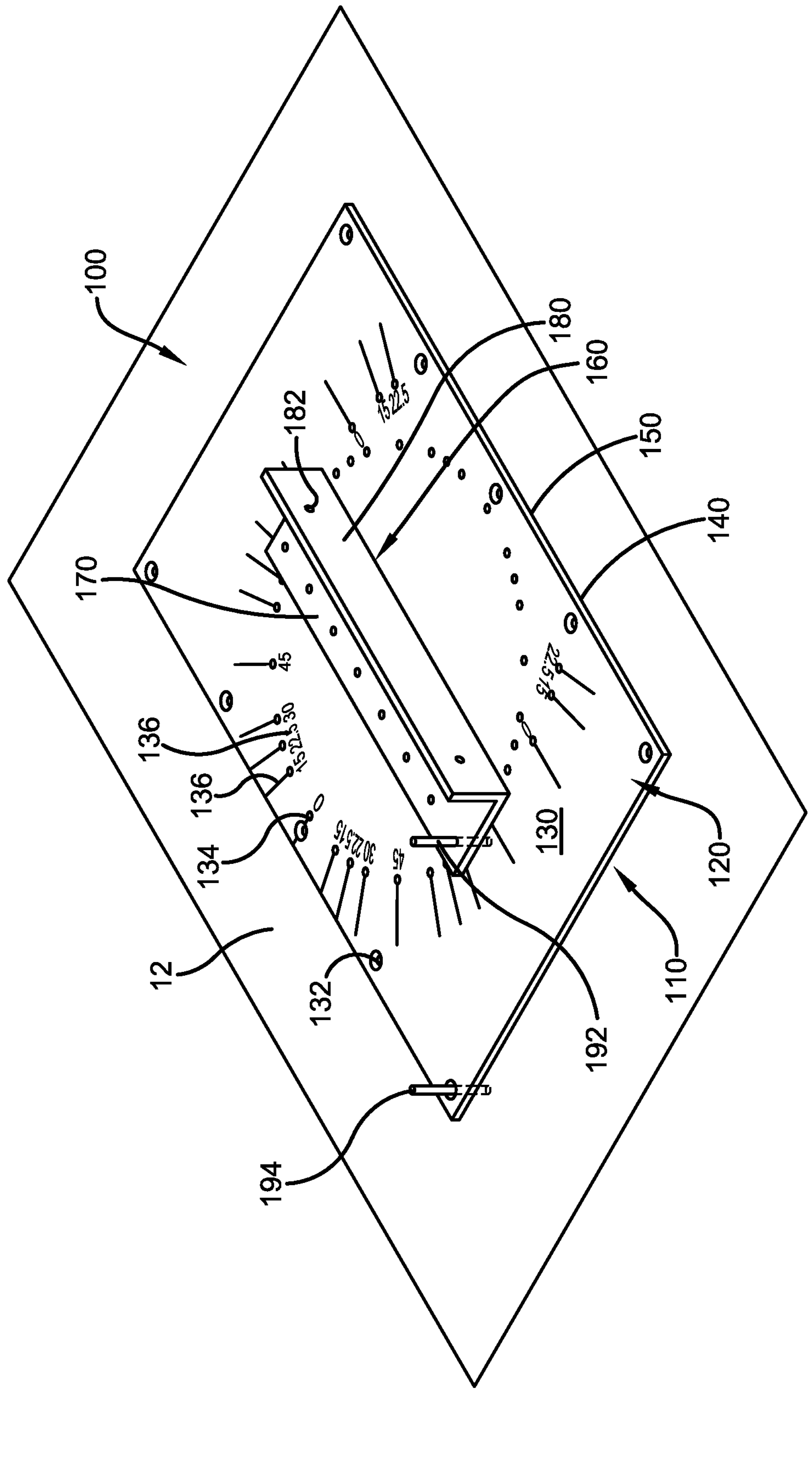
FIG. 1 illustrates a perspective view of one potential embodiment of the shooting board jig device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for an improved shooting board. There also exists a long-felt need in the art for a shooting board jig device that allows a user to plane a board at a plurality of differing angles. Finally, there exists a long-felt need in the art for a shooting board jig device that is ambidextrous, such that it can be used by both left-handed and right-handed users.

The present invention, in one exemplary embodiment, is comprised of a shooting board jig device. The device is primarily comprised of a body that is further comprised of a base plate and a guide fence. The body is preferably rectangular in shape, and is comprised of a durable metal material. Furthermore, the top surface of the base plate is comprised of at least one continuous fastener opening that can receive at least one fastener, such as but not limited to, a screw, a bolt, or a nail. The fastener can be used to fixedly or removably attach the base plate to a surface, such as but not limited to, a work bench (not shown). A guide fence further attaches to the top surface via a pivot pin. The pivot pin allows the fence to be repositioned within a 360-degree range of movement. The guide fence is further comprised of a horizontal member that is fixedly or removably attached to a vertical member that forms a generally L-shaped body of the guide fence.

The top surface of the base plate is further comprised of a plurality of indicia. The indicia is disposed in a radial fashion around the guide fence, wherein the indicia may include guide lines (i.e., vertical lines) as well as angle measurements, such as but not limited to: 0°, 15°, 22.5°, 30°, 45°, or any other angle within 360°. At least one continuous opening is further located above or below each indicia. The guide fence can be repositioned (i.e., rotated) on the top surface, such that at least one continuous opening on the horizontal member of the fence aligns with the at least one continuous opening on the top surface of the base plate. Therefore, the fence can be positioned at a specific angle in relation to the base plate, as indicated by the indicia. To removably-secure the guide fence at the desired angle, a removable pin can further be secured through the opening of the horizontal member and the corresponding opening on the top surface.

The device can be further comprised of a method of using the device to plane a board using a hand planer. First, a user secures the base plate to a surface (i.e., a work bench) via placing at least one fastener through at least one continuous fastener opening of the base. Next, a user can reposition the guide fence to orient the fence at a desired angle relative to the hand planer, wherein the angle can be identified via the indicia of the top surface of the base plate. A user can then secure the fence in the desired position via inserting a pin through the continuous openings of the horizontal member of the fence and the corresponding continuous opening in the base plate. Next, a user can place a wooden board on the fence, such that the board rests on the horizontal member with the edge of the board sitting flush against the vertical member. Then, the desired edge or end of the board can be planed using the hand planer to shave the edge or end at the desired current angle of the guide fence.

Accordingly, the shooting board jig device of the present invention is particularly advantageous as it allows a user to plane a board at a plurality of differing angles. In addition, because of the 360 degree rotation of the guide fence that allows a hand planer to be positioned on any side of the base plate, the device can be used by both left-handed and right-handed users. In this manner, the shooting board jig device overcomes the limitations of existing shooting boards known in the art.

Referring initially to the drawings, FIG. 1 illustrates a perspective view of one embodiment of the shooting board jig device 100 of the present invention. The device 100 is primarily comprised of a body 110 further comprised of a base plate 120 and a guide fence 160. The body 110 and all components are preferably comprised of a durable, magnetic or non-magnetic metal, such as stainless steel or aluminum, etc., or any other suitable material as is known in the art. Although, in differing embodiments the body 110 and all components may be comprised of a durable wood, or a rigid plastic such as, but not limited to, acrylic, polycarbonate, polyethylene, thermoplastic, acrylonitrile butadiene styrene, low density polyethylene, medium density polyethylene, high density polyethylene, polyethylene terephthalate, polyvinyl chloride, polystyrene, polylactic acid, acetal, nylon, fiberglass, etc. The base plate 120 is preferably rectangular or square in shape, but can be any suitable shape as is known in the art. The base plate 120 comprises a top surface 130, bottom surface 140, and two sets of generally parallel side surfaces 150. Although, in differing embodiments the base plate 120 may be any shape known in the art, such as but not limited to, circular, triangular, octagonal, hexagonal, etc.

The top surface 130 of the base plate 120 is further comprised of at least one continuous fastener opening 132. The fastener opening 132 can receive at least one fastener 194 as is known in the art, such as but not limited to, a screw, a bolt, or a nail, etc. In this manner, the fastener 194 can be used to fixedly or removably-attach the base plate 120 to a surface 12, such as but not limited to, a work bench (not shown). A guide fence 160 further attaches to the top surface 130 via a pivot pin 190 (shown in FIG. 2). The pivot pin 190 allows the guide fence 160 to be repositioned within a 360-degree range of movement. The guide fence 160 is further comprised of a horizontal member 170 that is fixedly or removably-attached to a vertical member 180 that forms a generally L-shaped body. The horizontal member 170 and the vertical member 180 can be a one-piece integral component, or two separate components secured together.

Figure 2:
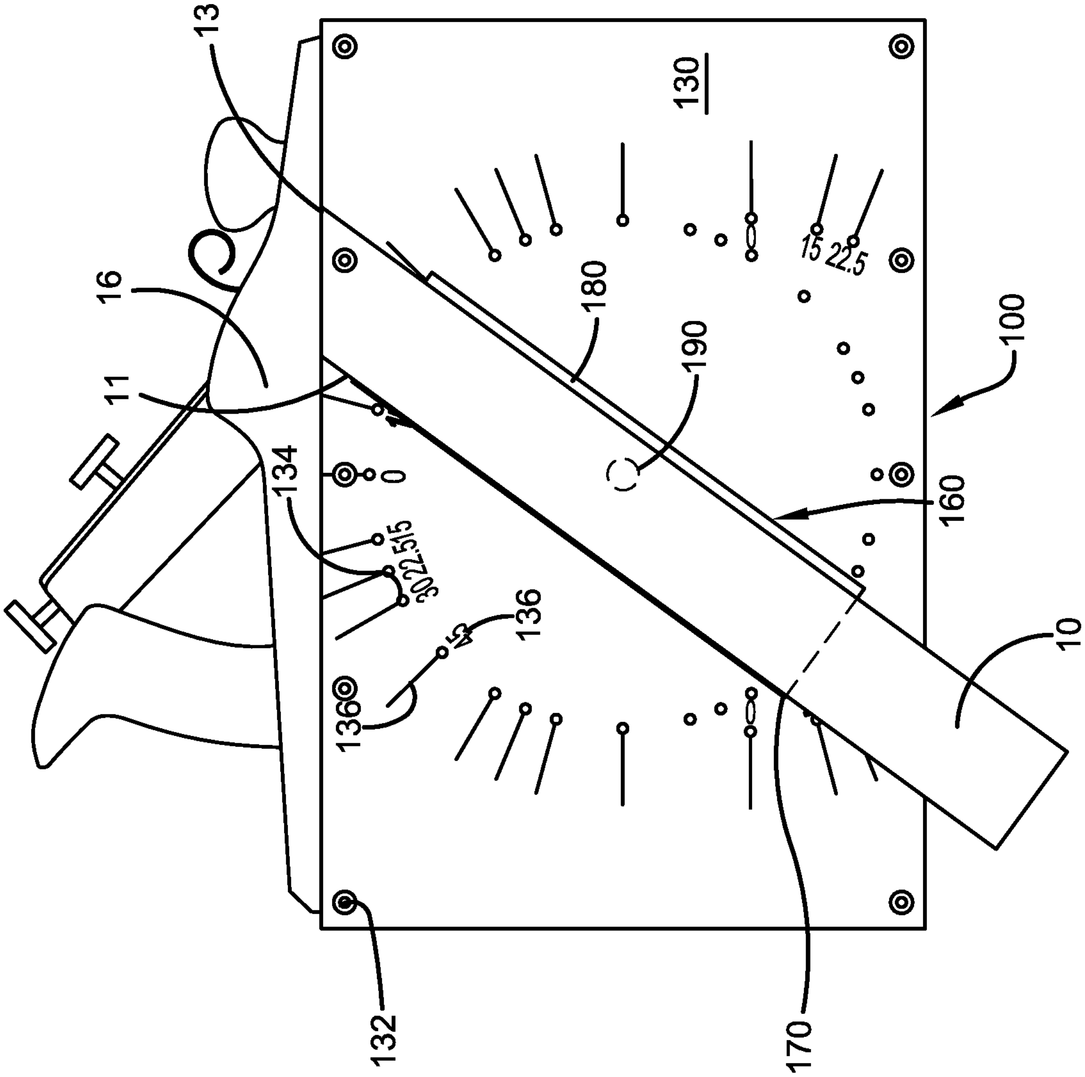
FIG. 2 illustrates a top view of one potential embodiment of the shooting board jig device of the present invention while a hand planer is being used to plane a board in accordance with the disclosed architecture.

FIG. 2 illustrates a top view of one embodiment of the shooting board jig device 100 of the present invention while a hand planer 16 (shown as prior art) is being used to plane a board 10. The top surface 130 is further comprised of a plurality of indicia 136 disposed in a radial fashion around the guide fence 160. The indicia 136 may include guide lines (i.e., vertical lines) as well as angle measurements such as, but not limited to, 0°, 15°, 22.5°, 30°, 45°, or any other angle within 360°. At least one semi-continuous opening 134 is further located above or below each indicia 136 (and wherein the guide line indicia 136 preferably extends from the opening 134). In this manner, the guide fence 160 can be repositioned (i.e., rotated) on the top surface 130, such that at least one continuous opening 172 on the horizontal member 170 aligns with the at least one semi-continuous opening 134 on the top surface 130. In this manner, the guide fence 160 can be positioned at a specific angle in relation to the base plate 120, as indicated by the indicia 136. To removably-secure the guide fence 160 at the desired angle, a removable pin 192 can further be secured through the opening 172 of the horizontal member 170 and the corresponding opening 134 on the top surface 130. In lieu of a pin 192, the guide fence 160 can be secured via any other similar fastener means such as, but not limited to, a clamp, a latch, a lock, etc. In addition, the vertical member 180 of the guide fence 160 may be comprised of at least one continuous opening 182 that allows the vertical member 180 to be removable or fixedly-secured to a piece of wood or other nearby structure via inserting a fastener 194 through the opening 182 to provide further support to the guide fence 160.

Figure 3:
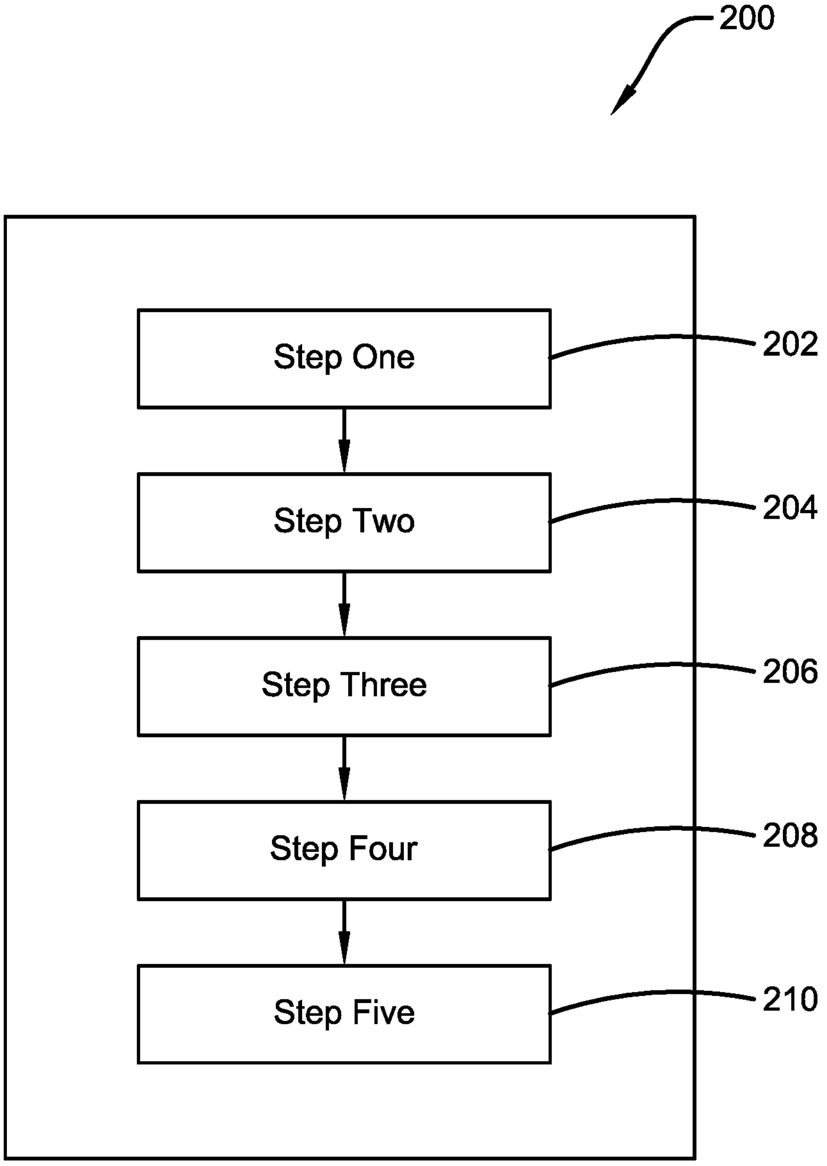
FIG. 3 illustrates a flow chart of one potential method of using the shooting board jig device of the present invention in accordance with the disclosed architecture and for its intended purpose.

FIG. 3 illustrates a flow chart of one method 200 of using the shooting board jig device 100 of the present invention. The device 100 can be used to plane a board 10 using a hand planer 16 (shown as prior art). First, at 202 a user secures the base plate 120 to a surface 12 (i.e., a work bench) via placing at least one fastener 194 through at least one continuous fastener opening 132 of the base plate 120. It should be noted that when securing the base plate 120, a user can position the plate 120 such that a hand planer 16 can be placed parallel with any of the side surfaces 150 of the base plate 120. In this manner, the device 100 can be positioned in relation to a hand planer 16 to allow both right-handed and left-handed users to easily use the device 100 and hand planer 16, regardless of the position of the hand planer 16. Next, at 204 a user can reposition the guide fence 160 to orient the guide fence 160 at a desired angle relative to the hand planer 16, wherein the angle can be identified via the indicia 136 on the top surface 130. In repositioning the guide fence 160, a user must ensure that the continuous opening 172 of the horizontal member 170 aligns with the semi-continuous opening 134 of the corresponding angle. Then, at 206 a user can secure the guide fence 160 in the desired position via inserting the pin 192 through both openings 134, 172. Next, at 208 a user can place a wooden board 10 on the guide fence 160, such that the board 10 rests on the horizontal member 170, and the edge 11 of the board 10 sits flush against the vertical member 180. Then, at 210 the desired edge 11 or end 13 of the board 10 can be planed using the hand planer 16, to shave the edge 11 or end 13 at the desired current angle of the guide fence 160.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "shooting board jig device" and "device" are interchangeable, and refer to the shooting board jig device 100 of the present invention.

Notwithstanding the forgoing, the shooting board jig device 100 of the present invention and its various components can be of any suitable size and configuration as is known in the art without affecting the overall concept of the invention, provided that they accomplish the above-stated objectives. One of ordinary skill in the art will appreciate that the size, configuration and material of the shooting board jig device 100 as shown in FIGS. 1-3 is for illustrative purposes only, and that many other sizes and shapes of the shooting board jig device 100 are well within the scope of the present disclosure. Although the dimensions of the shooting board jig device 100 are important design parameters for user convenience, the shooting board jig device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A shooting board jig system comprising:

a hand planer and a shooting board jig device;

the shooting board jig device comprising:

a body;

a base plate comprised of top surface, a bottom surface, and two sets of parallel side surfaces; and a guide fence, wherein the guide fence receives a board and comprises a horizontal member and a vertical member secured together to form an L-shaped body;

wherein the top surface of the base plate comprises at least one continuous fastener opening and at least one fastener for securing the base plate to a surface;

wherein the base plate is secured to the surface via placing the at least one fastener through the at least one continuous fastener opening;

wherein the guide fence attaches to the top surface of the base plate via a pivot pin which allows the guide fence to be repositioned within a 360-degree range of movement; and a plurality of indicia in the form of a guide lines and angle measurements disposed in a radial configuration around the guide fence; and wherein each of the two sets of parallel side surfaces are configured to orient the hand planer parallel to any one of the two sets of parallel side surfaces so that a board can be planed by the hand planer at a specific angle determined by the position of the guide fence in relation to the base plate in either direction.

2. The shooting board jig system of claim 1, wherein at least one semi-continuous opening is positioned above or below each indicia of the plurality of indicia.

3. The shooting board jig system of claim 2, wherein the horizontal member comprises at least one continuous opening which aligns with the at least one semi-continuous opening.

4. The shooting board jig system of claim 3, wherein the guide fence can be repositioned on the top surface such that the at least one continuous opening of the horizontal member aligns with the at least one semi-continuous opening on the top surface allowing the guide fence to be positioned at the specific angle in relation to the base plate, as indicated by the plurality of indicia.

5. The shooting board jig system of claim 4, wherein a removable pin is placed through the at least one continuous opening of the horizontal member and the corresponding aligned at least one semi-continuous opening on the top surface to secure the guide fence at the specific angle.

6. A method of using a shooting board jig device to plane a board with a hand planer, the method comprising the steps of:

securing a base plate of the shooting board jig device to a surface;

placing at least one fastener through at least one continuous fastener opening of the base plate;

repositioning a guide fence at a desired angle relative to a hand planer, wherein the angle can be identified via a plurality of indicia on a top surface of the base plate;

securing the guide fence at the desired angle via inserting a pin through at least one continuous opening of a horizontal member of the guide fence and through at least one semi-continuous opening of the base plate;

placing a wooden board on the guide fence, such that the wooden board rests on the horizontal member and an edge of the wooden board sits flush against a vertical member of the guide fence; and hand planing a desired edge or an end of the wooden board by shaving the edge or the end of the wooden board at the desired angle of the guide fence with a hand planer.

* * * * *